Aug. 1, 1939.  R. R. MORRILL  2,167,956
BROODER
Filed Aug. 5, 1936   2 Sheets-Sheet 1

INVENTOR
Richard R. Morrill
John A. Naismith
ATTORNEY

Aug. 1, 1939.  R. R. MORRILL  2,167,956
BROODER
Filed Aug. 5, 1936  2 Sheets-Sheet 2
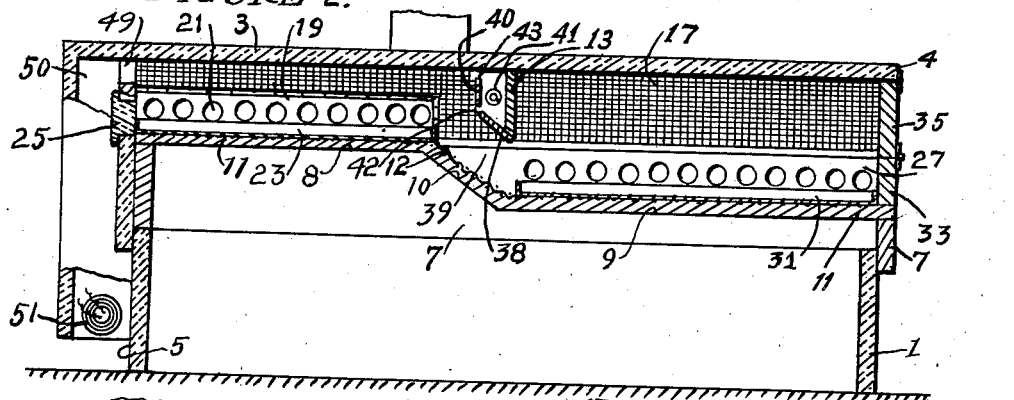
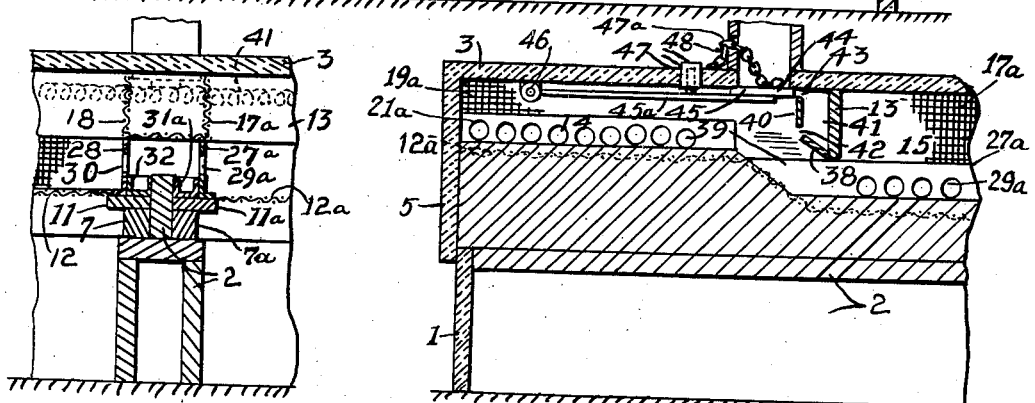
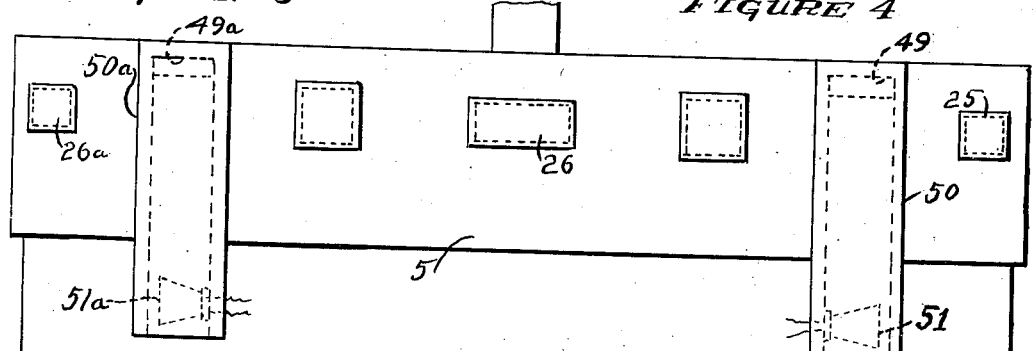
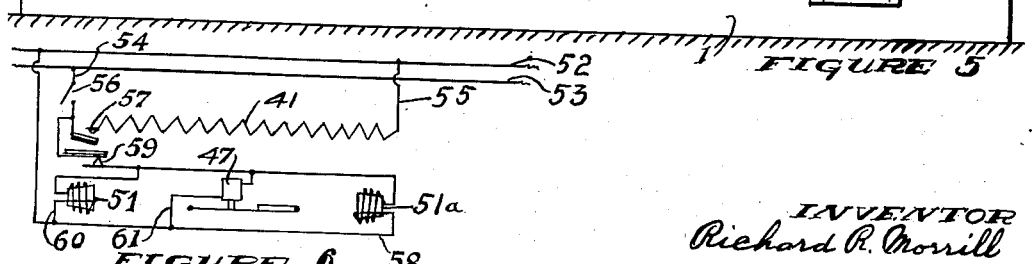
INVENTOR
Richard R. Morrill
John A. Naismith
ATTORNEY Patented Aug. 1, 1939

2,167,956

UNITED STATES PATENT OFFICE 2,167,956

BROODER

Richard R. Morrill, San Jose, Calif.

Application August 5, 1936, Serial No. 94,379

3 Claims. (Cl. 119—33)

In the care of young chicks during that period of time immediately following hatching the mechanical brooder has come into common use. In the operation of these brooders an attempt is made to approach as closely as possible the natural conditions to which a chick is subjected when under the care of the hen, but insofar as the present applicant is aware the results have heretofore been far from satisfactory.

There are, of course, many reasons for the apparent failure to achieve perfect results. Among these may be mentioned the following. Under natural conditions but few chicks are mothered by a single hen, and when they all seek the warmth of her protecting body each one has a certain freedom of movement and plenty of air. Furthermore they may pass freely back and forth from one temperature to the other as their natural instincts dictate, with ease and without confusion.

Mechanical brooders must of necessity accommodate a large number of chicks, and the temperature conditions are such that there is a tendency for them to crowd at certain times. This crowding results in the loss of the weaker chicks and interferes with the development of the stronger ones. When the crowding extends to the point where the chicks pile up even some of the stronger ones are lost. Again, such brooders do not permit the freedom of movement required, nor do they permit the chicks to pass quickly, easily, and naturally from one uniform temperature to another.

One object of the present invention, therefore, is to provide a brooder which will accommodate a large number of chicks and with the temperature and circulation of the air so controlled that the tendency of the chicks to crowd will be entirely eliminated.

Another object of the invention is to provide a brooder of the character indicated so arranged that the chicks may pass freely, easily and naturally from one temperature to another as their individual instincts may dictate.

It is also an object of the invention to provide a brooder of the character indicated that will be economical to manufacture; that will be clean and sanitary; in which the feed troughs may be easily cleaned and filled without disturbing the chicks; in which the runs may be removed from the housing as a whole for cleaning or airing; and that will be simple in form and construction, strong and durable, and highly efficient in its practical application.

In the drawings:

Figure 2 is a sectional view on line 2—2 of Figure 1.

Figure 3 is a sectional view on line 3—3 of Figure 1.

Figure 4 is a sectional view on line 4—4 of Figure 1.

Figure 5 is a rear elevation of the brooder.

Figure 6 is a diagram of the electrical wiring for the air circulating and temperature control devices.

In the present disclosure a double brooder is shown but the detailed description is confined to one only. Where the adjoining parts of the other appear in the illustrations they are designated by similar numerals followed by the letter "a".

Figure 1:
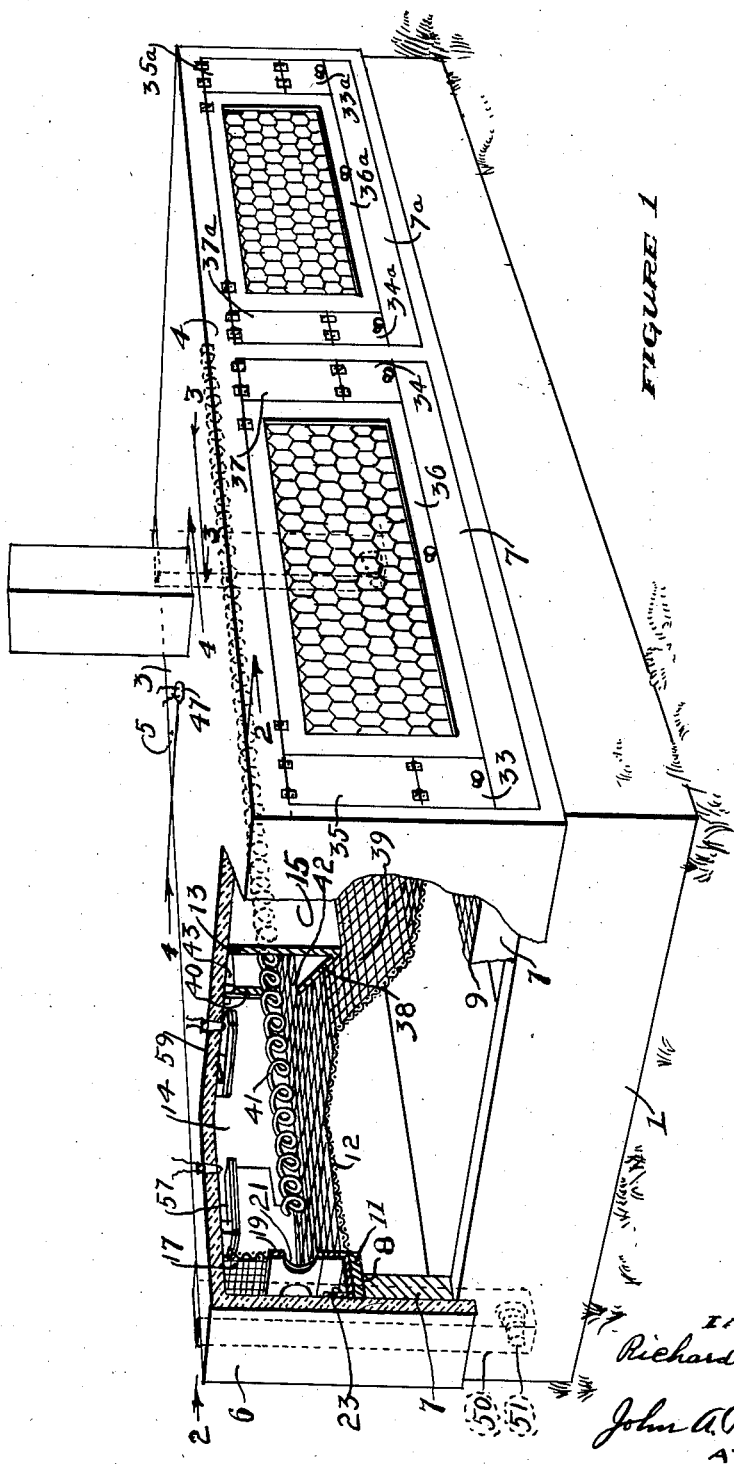
Figure 1 is a perspective view of a brooder embodying my invention with parts broken away and partly in section.

Referring now more particularly to the drawings, I show at 1 a base frame preferably made of heat and cold insulating material for the superstructure having a partition structure 2 extending from front to back at its center, the top edges of the parts 1—2 forming a slide for the floor structure hereinafter described.

The superstructure mounted on base 1 is heat and cold insulated and comprises top 3, front 4, back 5, and ends as 6.

The floor of the brooder comprises a frame 7 that slides on the top edges of parts 1—2, its front end being flush with the face of front 4.

This frame 7 is formed to provide two levels, the rear portion providing the higher level 8 and the front portion providing the lower level 9, the two levels being connected by an inclined portion 10, the inclined portion being disposed at approximately the center of the sides as shown.

Extending around the top of frame 7 is a flat strip 11, and mounted on this strip is a screen of any suitable or desired mesh as 12. Since the sides of the frame have an inclined portion it follows that the screen 12 forms upper and lower floors connected by an inclined floor portion as shown.

At 13 is shown a baffle board depending from top 3 and extending crosswise of the brooder and dividing it into an upper chamber 14 and a lower chamber 15, this board extending downwardly to the level of the upper floor and immediately over the line of juncture of the lower floor with the inclined portion of the floor, but high enough to permit the frame 7 to slide thereunder.

Depending from the top 3 adjacent each side of the chambers is a screen as 17 and 18, and depending from that portion of the screen in the upper chamber 15 is a plate as 19 and 20 provided with holes as 21—22 through which the chicks may feed. Back of each plate and resting on strip 11 is a removable feed trough as 23—24. These troughs may be removed at will through normally closed openings 25—26 in back 5.

In chamber 15 the screens 17—18 extend down to the bottom of baffle 13, and the plates as 27—28 with feed holes 29—30 are mounted on the frame 7. The feed troughs 31—32 may be removed as desired through doors 33—34, or the entire frame 7 with all of the parts mounted thereon may be removed from the housing by opening the several doors 35, 36, 37.

Mounted upon the lower edge of baffle 13 is a plate 38. This plate extends the full length of the baffle and is disposed in parallel relation to the inclined portion of the underlying floor, forming a top to the passage 39 connecting chambers 14 and 15.

Spaced above the free edge of plate 38 and below the top 3, and parallelly arranged with respect to the baffle 13, is another plate 40. This plate is spaced from the baffle, and in this intervening space is mounted a heater coil 41, the coil extending from one end of the brooder to the other and inserted in an electric circuit as hereinafter described. The spaces provided at the bottom and top of plate 40 provide air circulation passages and are designated by the numerals 42 and 43 respectively.

In the top 3 and in the center thereof, is provided an outlet passage 44. A valve 45 covers this passage and is mounted on an arm 45a pivoted at 46. A solenoid magnet is shown at 47 with its core attached to arm 45. The degree to which the valve may open when the magnet is not energized is determined by a chain 47a attached thereto and adjustable at 48 on the exterior of the top.

At the upper edge of the rear wall 5 of the housing is formed a slot 49 communicating with a vertically disposed conduit 50 which passes downwardly and terminates at a point just above the surface of the ground, the bottom end of the conduit being open to the atmosphere. Just within the lower end of the conduit is mounted a heater unit 51.

The heater coil 41 is inserted in an electric circuit including main wires 52—53 and connecting terminal wires 54—55, with a switch at 56 and a thermostat at 57. The heater unit 51 and the magnet 47 are connected in multiple in an electric circuit including the wire 58 and thermostat 59 as shown at 60 and 61. The wire 58 is connected to one of the main wires and to 54 between the switch and thermostat 57, the thermostat 57 operating at a lower temperature than thermostat 59.

When the brooder is stocked and in full operation a gentle circulation of air is created by the unit 51. If the valve 45 is held in a closed position by the chain 47a the only way for air to escape from chamber 14 is for it to pass under the lower edge of baffle 13. Due to the position of this baffle relative to the floor of chamber 14 there is no appreciable circulation of air through chamber 14 when unit 51 is cut out, but when the unit is energized it heats the air entering conduit 50 thereby causing it to rise and pass into the chamber 14. This continued action serves to bring the entire body of air to a desired uniform temperature clear down to and through the floor of the chamber, eliminating drafts and creating no warm areas which would cause the chicks to crowd.

Again, suppose the valve is adjusted by means of the chain to open a predetermined distance and that both thermostats are closed; the heaters 41, 51 and 51a are operating and the valve 45 is closed, and the temperature rises. When the temperature becomes excessive the thermostat 57 operates to cut off the current from the heater 41. If this does not stop the rise of the temperature, the thermostat 59 operates to cut off the current from the heaters 51 and 51a and to allow the valve 45 to open. Then, as the temperature falls, the thermostat 59 operates to supply current to the heaters 51 and 51a and to close valve 45. If this does not stop the fall of the temperature, the thermostat 57 operates to supply current to the heaters 41.

It may be readily understood from the foregoing that the temperature of the air in chamber 14 may be maintained at a given point regardless of the temperature of the air outside, and that the required temperature may be maintained down to and over the entire floor of the chamber.

By means of the ramp connecting the two floor levels the chicks may pass freely from one floor to the other, and feed as they desire on either floor, passing quickly from one temperature to another as in nature.

An important feature of the invention is the fact that the upper chamber, or hover, forms a heat trap. Under some climatic conditions the air in said chamber may be maintained at the desired temperature merely by the animal heat generated therein. In such a case a controlled outlet as 44 may be used as desired, and in any case a uniform temperature is maintained over the whole area of the floor.

In the particular embodiment of the invention herein disclosed the doors 36—36a are screened and not glazed and consequently the lower chamber is exposed to atmospheric conditions, but the temperature in this chamber is somewhat modified by the warm air discharged into it from the upper chamber, thereby preventing the air therein from dropping to extreme low temperatures on excessively cold days. Of course this front may be closed or glazed and the air allowed to escape below as from chamber 14 if so desired.

While the two chambers 14—15 are herein shown in one housing it is clear that the structure including the chamber 14 with the ramp and baffle 13 may be used independently of chamber 15, the room in which the device is placed then becoming chamber 15.

It is to be understood, of course, that while I have herein shown and described but on specific embodiment of the invention, changes in form, construction, and mode of operation may be made within the scope of the appended claims.

I claim:

1. A brooder comprising, a housing having a baffle depending from the top thereof and extending from side to side thereof intermediate its depth, a floor structure slidably mounted in said housing to pass beneath said baffle and having upper and lower ramp connected floor levels, the baffle being over the lower floor level, a normally closed opening in said housing through which the floor structure may be moved, and air heating and circulating devices associated with the interior of the housing above the upper floor level.

2. A brooder comprising, a housing having a baffle depending from the top thereof and extending from side to side thereof intermediate its depth, a floor structure slidably mounted in said housing to pass beneath said baffle and having upper and lower ramp connected floor levels, the baffle being over the lower floor level, a normally closed opening in said housing through which the floor structure may be moved, air heating and circulating devices associated with the interior of the housing above the upper floor level, feed troughs slidably mounted on the floor structure, said housing having normally closed openings to permit passage of the troughs, apertured walls fixedly associated with the housing to isolate the troughs on the upper floor level, and apertured walls fixedly associated with the floor structure to isolate the troughs on the lower floor level.

3. A brooder comprising, a housing having upper and lower ramp connected floors, baffle means disposed therein to divide the same into upper and lower chambers and to direct the flow of air from the upper to the lower chamber below the plane of the upper chamber floor, air supply means leading into the upper portion of the upper chamber, upper-chamber-temperature controlled air heating means disposed in said air supply means, upper-chamber-temperature controlled air heating means disposed to communicate with said chamber, the controlling means for said last two heating means being operable at different temperatures and an adjustable ventilator in the upper chamber mounted to open and close in cooperative relationship with said first mentioned air heating means.

RICHARD R. MORRILL.